(12) United States Patent
Wang et al.

(10) Patent No.: US 11,276,851 B2
(45) Date of Patent: Mar. 15, 2022

(54) ELECTROCHEMICAL UNIT, MANUFACTURING METHOD AND USE OF THE SAME AS COMPONENT OF BATTERIES, AND ELECTROCHEMICAL DEVICE INCLUDING THE SAME

(71) Applicant: Institute of Nuclear Energy Research, Atomic Energy Council, Executive Yuan, R.O.C., Taoyuan (TW)

(72) Inventors: Min-Chuan Wang, Taoyuan (TW); Yu-Lin Yeh, Taoyuan (TW); Yu-Chen Li, Taoyuan (TW); Ding-Guey Tsai, Taoyuan (TW); Der-Jun Jan, Taoyuan (TW)

(73) Assignee: INSTITUTE OF NUCLEAR ENERGY RESEARCH, ATOMIC ENERGY COUNCIL, EXECUTIVE YUAN, R.O.C., Taoyuan (TW)

( * ) Notice: Subject to any disclaimer, the term of this patent is extended or adjusted under 35 U.S.C. 154(b) by 292 days.

(21) Appl. No.: 16/503,466

(22) Filed: Jul. 3, 2019

(65) Prior Publication Data
US 2020/0259167 A1    Aug. 13, 2020

(30) Foreign Application Priority Data
Feb. 13, 2019   (TW) ................. 108104840

(51) Int. Cl.
*H01M 4/36*    (2006.01)
*H01M 4/52*    (2010.01)
*H01M 4/04*    (2006.01)

(52) U.S. Cl.
CPC ......... *H01M 4/364* (2013.01); *H01M 4/0402* (2013.01); *H01M 4/366* (2013.01); *H01M 4/523* (2013.01)

(58) Field of Classification Search
None
See application file for complete search history.

(56) References Cited

U.S. PATENT DOCUMENTS

| | | | | |
|---|---|---|---|---|
| 5,680,292 A * | 10/1997 | Thompson, Jr. | ....... | H01G 9/155 361/528 |
| 2006/0228897 A1 * | 10/2006 | Timans | ............. | H01L 21/67115 438/758 |
| 2012/0003535 A1 * | 1/2012 | Yamazaki | ............. | H01M 4/405 429/218.1 |
| 2018/0076394 A1 * | 3/2018 | Kawakami | ........... | C07D 307/77 |
| 2019/0074505 A1 | 3/2019 | Wang et al. | | |
| 2021/0175580 A1 * | 6/2021 | Amos | ................ | H01M 50/403 |

FOREIGN PATENT DOCUMENTS

TW          I634221 B        9/2018

* cited by examiner

*Primary Examiner* — Jonathan Crepeau
*Assistant Examiner* — Angela J Martin
(74) *Attorney, Agent, or Firm* — Cheng-Ju Chiang

(57) ABSTRACT

The present invention provides an electrochemical unit, a manufacturing method for the same and a use of the same as a component of batteries, and an electrochemical device including the same. The electrochemical unit includes a mixture layer and a transition metal oxide layer. The mixture layer includes an oxide made of a first transition metal, an oxide made of a second transition metal, and a first alkali metal. The transition metal oxide layer is disposed on one side of the mixture layer, where the transition metal oxide layer includes a third transition metal oxide.

10 Claims, 3 Drawing Sheets

ELECTROCHEMICAL UNIT, MANUFACTURING METHOD AND USE OF THE SAME AS COMPONENT OF BATTERIES, AND ELECTROCHEMICAL DEVICE INCLUDING THE SAME

BACKGROUND

Technical Field

The present invention relates to an electrochemical unit, a manufacturing method for the same and a use of the same as a component of batteries, and an electrochemical device including the same.

Related Art

In recent years, the global greenhouse effect has been serious, and how to save energy has become one of the major goals of the world. In modern buildings, glass windows have been widely used. When widely used in buildings and vehicles, high heat is generated. How to avoid this disadvantage is one of the key points of energy saving.

A smart window uses electrochromic units, which are low-energy electrochemical units, making them ideal for energy saving buildings. The smart window can actively adjust the transmittance of visible light and radiant heat according to the brightness and temperature required by indoor users. Therefore, the smart window has great market potential in the future development of energy-saving buildings. In addition, electrochromic units will produce many different derivative applications in the future.

Secondary batteries are also an electrochemical unit. Secondary batteries are required for smartphones, cameras, automobiles, and various industrial equipment. In addition, the Internet of Things (IoT), wearable devices, and environmental sensors all require new appearances and designs that a traditional battery technology simply cannot provide. In the future, the application of secondary batteries will continue to increase.

As shown in FIG. 1, a common electrochemical unit 80 includes an anode metal oxide layer 22, an electrolyte layer 10, and a cathode metal oxide layer 21, and may further constitute an electrochemical device 90 with conductive layers 31 and 32. However, since production of the foregoing electrochemical unit requires a complicated vacuum film process, production costs of the electrochemical unit are greatly increased, and thus the electrochemical unit has not been popularized till today.

On the other hand, an arc plasma coating process is susceptible to magnetism, which is not conducive to the use of magnetic materials as targets for production of electrochemical units.

SUMMARY

It is an object of the present invention to provide an electrochemical unit.

It is another object of the present invention to provide a use of the electrochemical unit as a component of batteries.

It is another object of the present invention to provide a manufacturing method for the electrochemical unit.

It is another object of the present invention to provide an electrochemical device.

The electrochemical unit of the present invention includes a mixture layer and a transition metal oxide layer. The mixture layer includes an oxide made of a first transition metal, an oxide made of a second transition metal, and a first alkali metal. With respect to the mixture layer, total content of the oxide made of the first transition metal and the oxide made of the second transition metal is 70 wt % to 80 wt %, and content of the first alkali metal is 20 wt % to 30 wt %. The transition metal oxide layer is disposed on one side of the mixture layer, and includes a third transition metal oxide.

In an embodiment of the present invention, the mixture layer has a refractive index of less than 2.

In an embodiment of the present invention, the mixture layer includes a plurality of columnar structures.

In an embodiment of the present invention, the first transition metal and the second transition metal have a melting point higher than a melting point of the first alkali metal.

In an embodiment of the present invention, the mixture layer further includes a second alkali metal.

In an embodiment of the present invention, the first alkali metal is lithium, the first transition metal is tantalum, the second transition metal is nickel, and the third transition metal is tungsten.

An electrochemical device of the present invention includes the electrochemical unit described above, a first electrode, and a second electrode. The first electrode is disposed on one side of the electrochemical unit relative to the mixture layer. The second electrode is disposed on the other side of the electrochemical unit relative to the mixture layer.

The manufacturing method for the electrochemical unit of the present invention includes the following steps: (S1000) providing a substrate; (S2000) disposing a first alkali metal at an anode of a first arc plasma coating process; (S3000) disposing a transition metal alloy at a cathode of the first arc plasma coating process, where the transition metal alloy includes a first transition metal and a second transition metal, the transition metal alloy having a melting point higher than a melting point of the first alkali metal; (S4000) forming a mixture layer on the substrate through the first arc plasma coating process; (S5000) disposing a third transition metal at a cathode of a second arc plasma coating process; and (S6000) forming a transition metal oxide layer on the mixture layer through the second arc plasma coating process.

In an embodiment of the present invention, the step S2000 further includes disposing a second alkali metal at the anode of the first arc plasma coating process, where the transition metal alloy has a melting point higher than a melting point of the second alkali metal.

DETAILED DESCRIPTION

Figure 1:
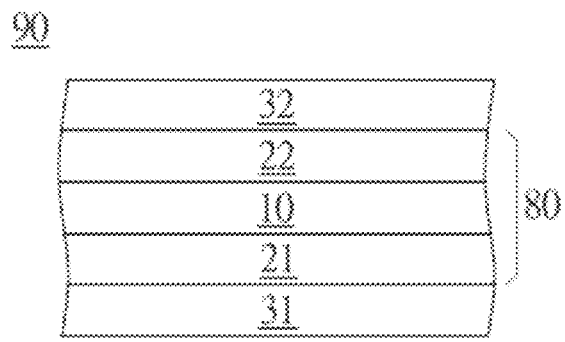
FIG. 1 is a schematic diagram of the prior art.
Figure 2:
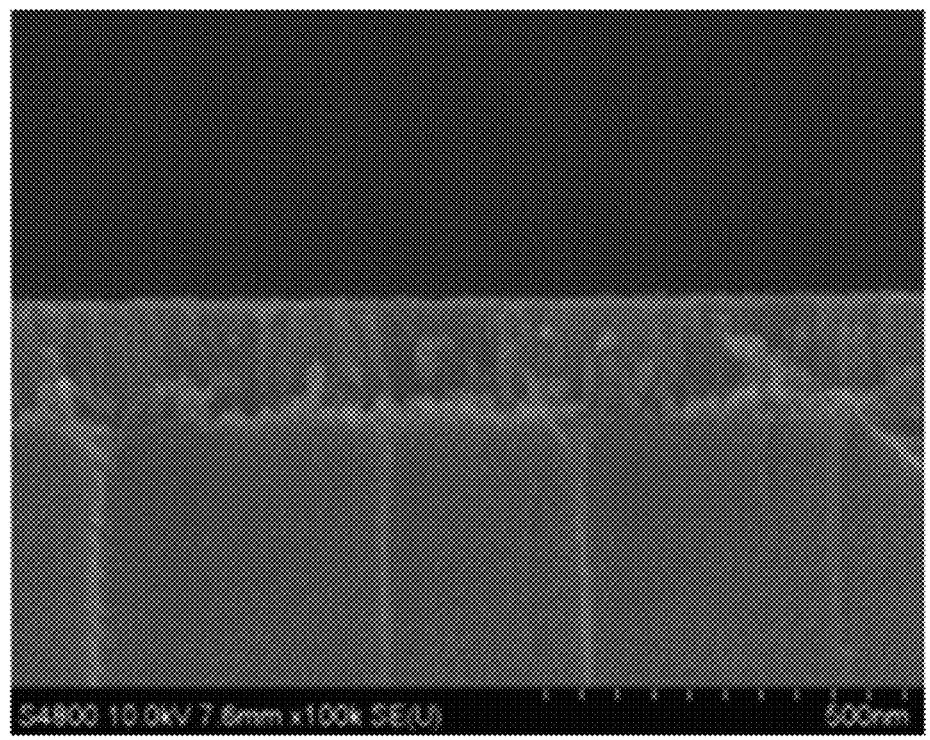
FIG. 2 is an electron scanning microscope image of a mixture layer in an electrochemical unit of the present invention.

As shown in an embodiment of FIG. 2, an electrochemical unit 800 of the present invention includes a mixture layer 100 and a transition metal oxide layer 200. The mixture layer 100 includes an oxide made of a first transition metal, an oxide made of a second transition metal, and a first alkali metal. With respect to the mixture layer, total content of the oxide made of the first transition metal and the oxide made of the second transition metal is 70 wt % to 80 wt %, and content of the first alkali metal is 20 wt % to 30 wt %. As viewed from a different angle, the first alkali metal is doped in a mixture of the oxide made of the first transition metal and the oxide made of the second transition metal. The transition metal oxide layer 200 is disposed on one side of the mixture layer 100, and includes a third transition metal oxide.

In an embodiment, the first transition metal is tantalum, the second transition metal is nickel, and the third transition metal is tungsten. That is, the mixture layer 100 includes a mixture of $TaO_5$, NiO, and Li, and the transition metal oxide layer 200 includes $WO_3$. The electrochemical unit 800 reacts as follows:

$$W^{6+} \leftarrow\rightarrow W^{5+} \text{ and } Ni^{2+} \leftarrow\rightarrow Ni^{2.5+}$$

Since the $WO_3$ included in the transition metal oxide layer 200 has electrochromic properties, the electrochemical unit 800 is an electrochromic unit in this embodiment. However, in a different embodiment, the electrochemical unit 800 can be specifically functional, for example, as a component of batteries, by using a different third transition metal oxide.

Further, the oxide made of the first transition metal and the oxide made of the second transition metal are respectively used to conduct ions of the first alkali metal and to perform a redox reaction. In other words, compared with a anode metal oxide layer/electrolyte layer/cathode metal oxide layer three-layer sandwich structure of a conventional electrochemical unit in which the electrolyte layer is for ion conduction and the anode or cathode metal oxide layer is for the redox reaction, the mixture layer 100 in the electrochemical unit 800 of the present invention can be simultaneously for ion conduction and redox reaction, and thus, can replace the structure including the electrolyte layer and one of the anode metal oxide layer and the cathode metal oxide layer in the conventional electrochemical unit, that is, the anode metal oxide layer/electrolyte layer structure or the electrolyte layer/cathode metal oxide layer structure. Thereby, the thickness can be reduced and the process steps can be reduced.

A refractive index (n value) of the mixture layer in the electrochemical unit of the present invention was measured. The n-value measurement results of the mixture layers with a $NiO/Ta_2O_5$ ratio of 1 formed at different coating rates are shown in Table 1. The n-value measurement results of the mixture layers with different coating rates and different $NiO/Ta_2O_5$ ratios are shown in Table 2. It can be known from the refractive index measurement results that the mixture layers in the electrochemical unit of the present invention respectively have a refractive index of less than 2.

TABLE 1

| Coating Rate (nm/s) | n value |
| --- | --- |
| 0.04 | 1.60 |
| 0.18 | 1.55 |
| 0.83 | 1.50 |
| 0.94 | 1.49 |

TABLE 2

| | Coating Rate (nm/s) | n value |
| --- | --- | --- |
| $NiO/Ta_2O_5 = 3$ | 0.8 | 1.96 |
| $NiO/Ta_2O_5 = 4$ | 0.9 | 1.80 |

On the other hand, the mixture layer in the electrochemical unit of the present invention was subjected to electron scanning microscopy, and the results are shown in FIG. 2. As can be learned from FIG. 2, the mixture layer in the electrochemical unit of the present invention includes a plurality of columnar structures.

Ion conduction rate measurement was carried out on the electrochemical unit ($NiO/Ta_2O_5$ alloy) of the present invention and a conventional electrochemical unit ($NiO/ZrO_2$ alloy), and the results are shown in Table 3. $NiO/Ta_2O_5$ and $NiO/ZrO_2$ are respectively 1. It can be known from refractive index measurement results that the electrochemical unit of the present invention has a better ion conduction rate.

TABLE 3

| Alloy Oxide Composition | Coating Rate (nm/s) | Ion Conduction Rate (S/cm) |
| --- | --- | --- |
| $NiO/Ta_2O_5$ alloy | 0.80 | $1.77 \times 10^{-7}$ |
| $NiO/ZrO_2$ alloy | 0.77 | $1.62 \times 10^{-8}$ |

In a preferred embodiment, the first transition metal and the second transition metal have a melting point higher than the melting point of the first alkali metal to facilitate the formation of the mixture layer through an arc plasma coating process. More specifically, when the mixture layer is formed through the arc plasma coating process, the alloy of the first transition metal and the second transition metal is disposed at the cathode, and the first alkali metal is disposed at the anode. When the first transition metal and the second transition metal at the cathode are heated by the arc to evaporate, the first alkali metal having a lower melting point can be simultaneously indirectly heated to evaporate, and deposited together with the oxide made of the first transition metal and the oxide made of the second transition metal to form a mixture layer. Since oxygen is introduced into the arc plasma coating process, the oxide made of the first transition metal and the oxide made of the second transition metal are formed.

In different embodiments, the mixture layer may further include a second alkali metal for manufacturing or use requirements. For example, the mixture layer can be doped with both lithium and magnesium.

Figure 3:
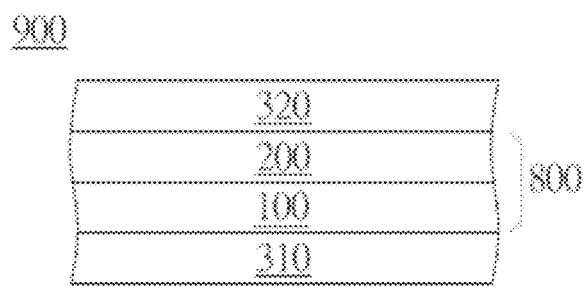
FIG. 3 is a schematic diagram of embodiments of an electrochemical unit and an electrochemical device of the present invention.

As shown in an embodiment of FIG. 3, an electrochemical device 900 of the present invention includes an electrochemical unit 800, a first electrode 310, and a second electrode 320. The first electrode 310 is disposed on one side of the electrochemical unit 800 relative to a mixture layer 100, that is, on an outer side of the mixture layer 100. The second electrode 320 is disposed on the other side of the electrochemical unit 800 relative to the mixture layer 100, that is, on an outer side of a transition metal oxide layer 200. The first electrode 310 may be a substrate having conductivity. The second electrode 320 may be a doped metal oxide film. The first electrode and the second electrode may use a known electrode material, for example, a metal or a metal oxide such as gold, silver, aluminum, copper, or indium tin oxide. The process can be vacuum sputtering or the like.

Figure 4:
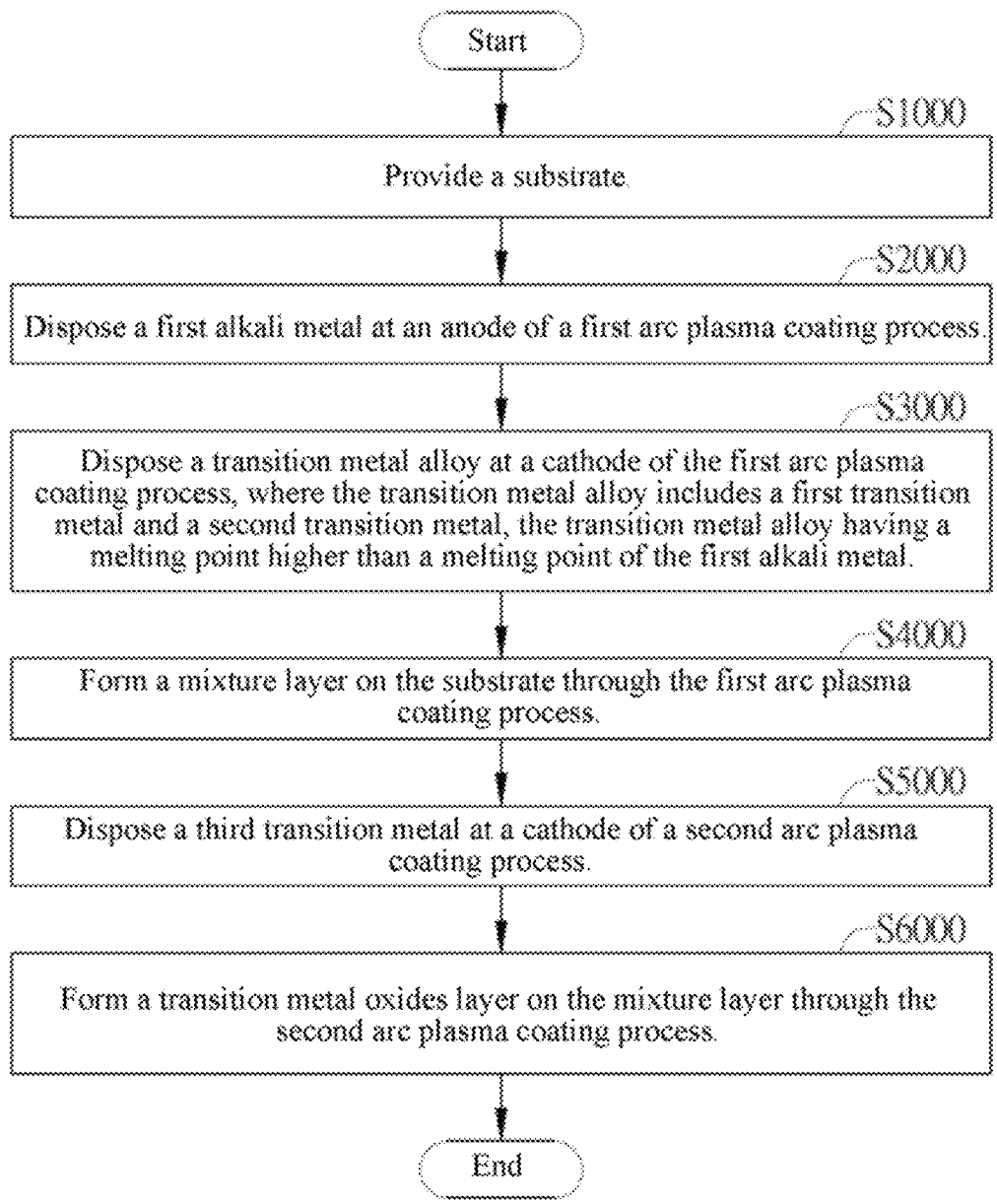
FIG. 4 is a schematic flowchart of an embodiment of a manufacturing method for the electrochemical unit of the present invention.

As shown in a flowchart of an embodiment shown in FIG. 4, a manufacturing method for the electrochemical unit of the present invention includes, for example, the following steps.

Step (S1000): Provide a substrate. The substrate may have conductivity. More specifically, the substrate is placed in an arc plasma coating apparatus.

Step (S2000): Dispose a first alkali metal at an anode of a first arc plasma coating process. More specifically, the first alkali metal is placed in the arc plasma coating apparatus and disposed at the anode.

Step (S3000): Dispose a transition metal alloy at a cathode of the first arc plasma coating process, where the transition metal alloy includes a first transition metal and a second transition metal, the transition metal alloy having a melting point higher than a melting point of the first alkali metal. More specifically, the transition metal alloy is placed in the arc plasma coating apparatus and disposed at the cathode.

Step (S4000): Form a mixture layer on the substrate through the first arc plasma coating process. More specifically, when the transition metal alloy located at the cathode is heated by the arc to evaporate the first transition metal and the second transition metal, the first alkali metal having a lower melting point can be simultaneously indirectly heated to evaporate, and deposited together with the oxide made of the first transition metal and the oxide made of the second transition metal in the transition metal alloy to form the mixture layer, that is, doped into the mixture layer. Since oxygen is introduced into the arc plasma coating process, the oxide made of the first transition metal and the oxide made of the second transition metal are formed.

Step (S5000): Dispose a third transition metal at a cathode of a second arc plasma coating process. More specifically, the third transition metal is placed in the arc plasma coating apparatus and disposed at the cathode.

Step (S6000): Form a transition metal oxide layer on the mixture layer through the second arc plasma coating process.

It can be learned from the above that according to the manufacturing method for the electrochemical unit of the present invention, by disposing the first alkali metal at the anode and disposing the transition metal alloy at the cathode in the arc plasma coating process, the mixture layer having both the oxide made of the first transition metal and the oxide made of the second transition metal can be directly formed, and the oxide made of the first transition metal and the oxide made of the second transition metal are respectively used to conduct ions of the first alkali metal and to perform a redox reaction. In other words, the manufacturing method for the electrochemical unit of the present invention requires only one arc plasma coating process to form the mixture layer, to replace the structure including the electrolyte layer and one of the anode metal oxide layer and the cathode metal oxide layer in the conventional electrochemical unit, that is, the anode metal oxide layer/electrolyte layer structure or the electrolyte layer/cathode metal oxide layer structure. In this way, the process steps and time can be reduced. On the other hand, since the transition metal alloy disposed at the cathode is in an alloy type, a magnetic metal alloy having a lower magnetic property than a pure magnetic metal can be used, so that the arc plasma coating process is more stable.

In different embodiments, the step (S2000) further includes disposing a second alkali metal at the anode of the first arc plasma coating process, where the transition metal alloy has a melting point higher than a melting point of the second alkali metal. In this way, the mixture layer also having the second alkali metal is formed in the step (S4000).

Although the foregoing description and drawings have disclosed the preferred embodiments of the present invention, it is to be understood that various additions, modifications, and substitutions may be used in the preferred embodiments of the present invention without departing from the spirit or scope of the principles of the present invention as defined by the appended claims. It will be appreciated by those of ordinary skill in the art to which the present invention pertains that the present invention may be modified in many forms, structures, arrangements, ratios, materials, units, and components. Therefore, the embodiments disclosed herein are to be considered as illustrative of the present invention and not to limit the present invention. The scope of the present invention should be defined by the appended claims, is intended to cover its legal equivalents, and is not limited to the foregoing description.

SYMBOL DESCRIPTION

10: Electrolyte layer
21: Cathode metal oxide layer
22: Anode metal oxide layer
31: Conductive layer
32: Conductive layer
80: Electrochemical unit
90: Electrochemical device
100: Mixture layer
200: Transition metal oxides layer
310: First electrode
320: Second electrode
800: Electrochemical unit
900: Electrochemical device
S1000: Step
S2000: Step
S3000: Step
S4000: Step
S5000: Step
S6000: Step

What is claimed is:

1. An electrochemical unit, comprising:
   a mixture layer, comprising an oxide made of a first transition metal, an oxide made of a second transition metal, and a first alkali metal, wherein with respect to the mixture layer, total content of the oxide made of the first transition metal and the oxide made of the second transition metal is 70 wt % to 80 wt %, and content of the first alkali metal is 20 wt % to 30 wt %;
   a transition metal oxide layer, disposed on one side of the mixture layer, wherein the transition metal oxide layer comprises a third transition metal oxide.

2. The electrochemical unit according to claim 1, wherein the mixture layer has a refractive index of less than 2.

3. The electrochemical unit according to claim 1, wherein the mixture layer comprises a plurality of columnar structures.

4. The electrochemical unit according to claim 1, wherein the first transition metal and the second transition metal have a melting point higher than a melting point of the first alkali metal.

5. The electrochemical unit according to claim 1, wherein the mixture layer further comprises a second alkali metal.

6. The electrochemical unit according to claim 1, wherein the first alkali metal is lithium, the first transition metal is tantalum, the second transition metal is nickel, and the third transition metal is tungsten.

7. A use of the electrochemical unit according to claim 1 as a component of batteries.

8. An electrochemical device, comprising:
the electrochemical unit according to claim 1;
a first electrode, disposed on one side of the electrochemical unit relative to the mixture layer; and
a second electrode, disposed on the other side of the electrochemical unit relative to the mixture layer.

9. A manufacturing method for an electrochemical unit, comprising the following steps:
(S1000) providing a substrate;
(S2000) disposing a first alkali metal at an anode of a first arc plasma coating process;
(S3000) disposing a transition metal alloy at a cathode of the first arc plasma coating process, wherein the transition metal alloy comprises a first transition metal and a second transition metal, the transition metal alloy having a melting point higher than a melting point of the first alkali metal;
(S4000) forming a mixture layer on the substrate through the first arc plasma coating process;
(S5000) disposing a third transition metal at a cathode of a second arc plasma coating process; and
(S6000) forming a transition metal oxide layer on the mixture layer through the second arc plasma coating process.

10. The manufacturing method for the electrochemical unit according to claim 9, wherein the step S2000 further comprises disposing a second alkali metal at the anode of the first arc plasma coating process, and the transition metal alloy has a melting point higher than a melting point of the second alkali metal.

* * * * *